EUGENE L. NOOKER
GEORGE W. GALLOWAY
INVENTORS

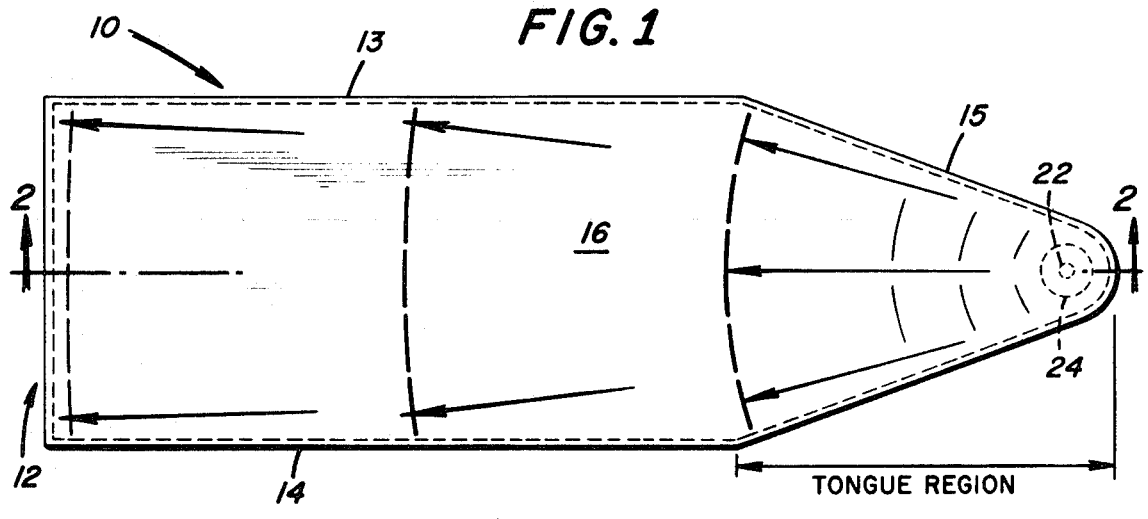
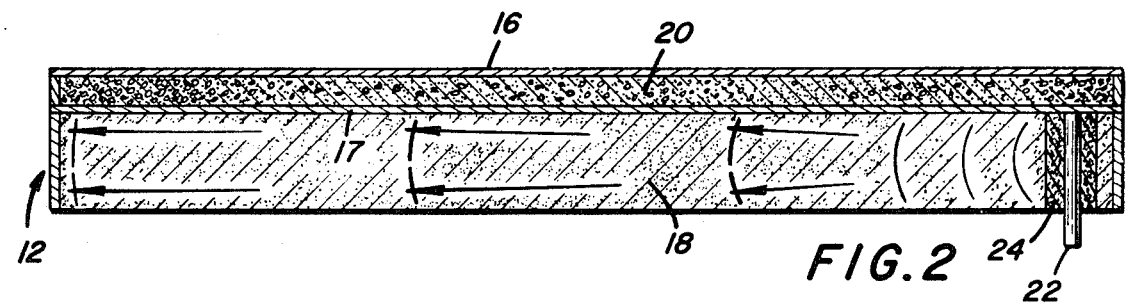
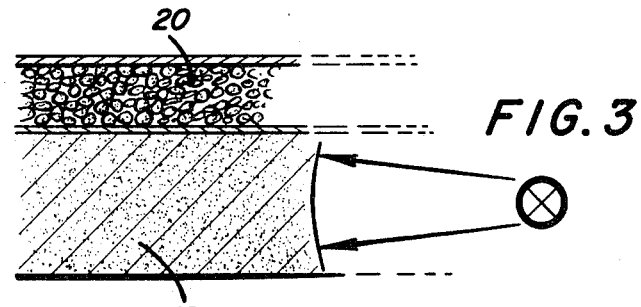
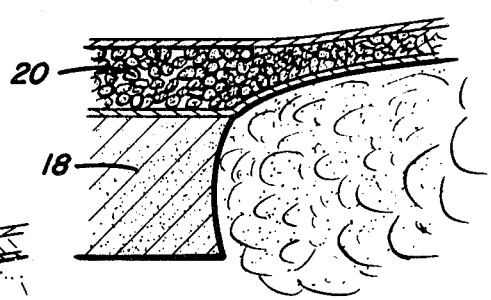
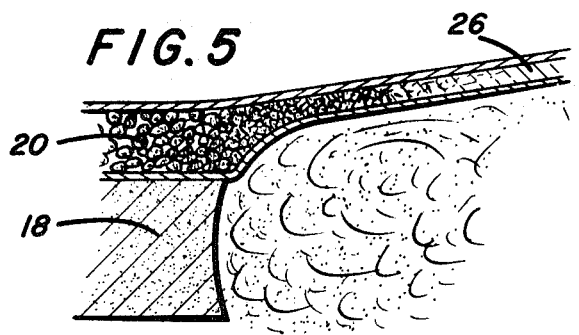
EUGENE L. NOOKER
GEORGE W. GALLOWAY
INVENTORS
BY John S. Lacey
ATTORNEY Sept. 20, 1971   E. L. NOOKER ET AL   3,605,860
METHOD FOR PRODUCING SOLID BODIES FROM POWDERED MATERIAL
Filed Dec. 4, 1968   4 Sheets-Sheet 2
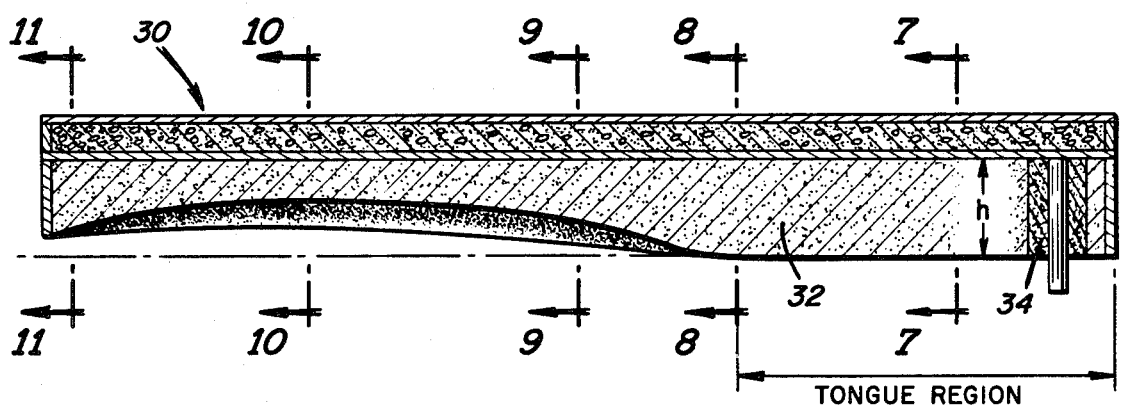
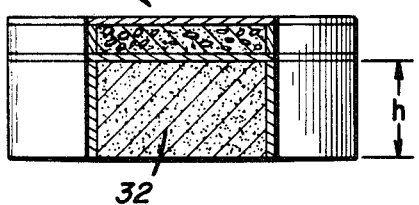
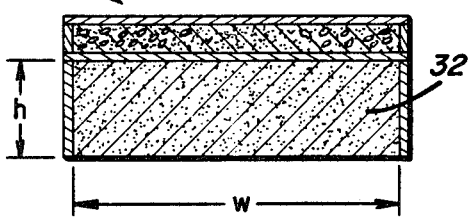 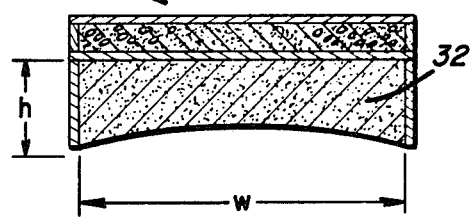
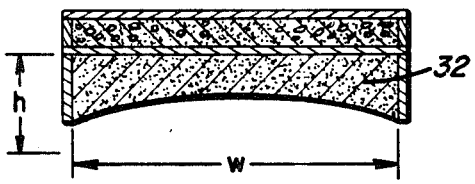 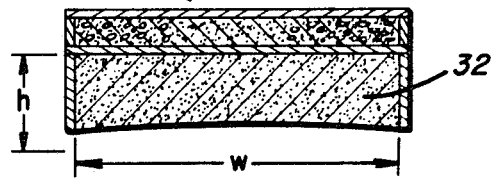
EUGENE L. NOOKER
GEORGE W. GALLOWAY
*INVENTORS*
BY John S. Lacey
ATTORNEY

BY John S. Lacey
ATTORNEY

TONGUE REGION

EUGENE L. NOOKER
GEORGE W. GALLOWAY
INVENTORS

BY *John S. Lacey*
ATTORNEY

United States Patent Office 3,605,860
Patented Sept. 20, 1971

3,605,860
METHOD FOR PRODUCING SOLID BODIES FROM POWDERED MATERIAL
Eugene L. Nooker, San Luis Obispo, and George W. Galloway, Baldwin Park, Calif., assignors to G. W. Galloway Company, Baldwin Park, Calif.
Filed Dec. 4, 1968, Ser. No. 781,100
Int. Cl. B22d 23/06; B22f 3/08
U.S. Cl. 164—80
17 Claims

ABSTRACT OF THE DISCLOSURE

A method for producing solid bodies from powdered material by the use of explosive forces. The forces involved are of sufficient magnitude and other parameters are so chosen that complete fusion of the particles of the powdered material takes place to produce bodies of pure metal or composed of alloy or mixture compositions of types now known as well as those beyond the ranges presently available, physical properties superior to those previously known and which may be composed of metallic or of metallic and non-metallic mixtures. This is in contrast to prior art methods which use relatively low magnitudes of explosive forces to achieve only mechanical compactions.

INTRODUCTION, OBJECTS AND BACKGROUND OF THE INVENTION

The present invention relates generally to a method for producing solid fused bodies from powdered material. More particularly, it pertains to a method which, among other objects, provides for utilizing explosive forces to obtain fusion bonding of particles to produce bodies equivalent to those presently made by conventional melting and casting or by powder metallurgy techniques, both of a pure and an alloyed nature; to produce bodies which have alloy or mixture compositions beyond the composition ranges presently available; and to produce such bodies having physical properties superior to those now available from conventional processing techniques, and, further, to produce such bodies which may be composed of metallic or of metallic and non-metallic mixtures.

So far as is known, the present invention has no particularly pertinent prior art since the true fusion bonding together of an entire body of particles by explosive means has not been hitherto achieved. Previous use of explosive forces has been to form powder compactions for various purposes, but without fusion bonding of the overall body as the principal objective or accomplishment.

Prior use of transient high pressures up to and including those produced by explosives has been concerned with both press-type techniques and shock techniques, in which the primary objective has been to achieve reasonably high density compacts.

Typical press-type techniques are disclosed in McKenna, U.S. Pat. No. 2,648,125, and Zernow et al., U.S. Pat. No. 3,157,498 and by Stein et al. in the publication Metal Progress for April 1964. McKenna uses a fluid surrounding a powder mass and small amounts of explosive or propellant to drive a piston against the fluid. Relatively low pressures for long times are achieved, i.e., about 60,000 p.s.i. for 25 to 50 milli-seconds. McKenna seeks only a good density compact for subsequent sintering. Similarly, Zernow et al. use small amounts of explosive to drive opposed pistons against a mass of powder. Zernow et al. seek only a high density compact and provide no information as to its strength or other properties. Stein et al. use a piston actuated by a propellant to obtain a high density compact. Like Zernow et al., they supply no information as to strength or other properties.

Disclosures of shock type techniques are found in Lenhart, U.S. Pat. No. 2,943,933, and Callender, U.S. Pat. No. 3,165,404. The Lenhart process is limited to Beryllium sheet and uses small amounts of high explosive modulated by large amounts of fluid. As in McKenna, supra, Lenhart discloses a pre-sintering process. He does not allege high density or particle bonding and does not provide strength or other property data. The Callender patent discloses a process for making a hollow metal object. According to Callender, metal powder is placed about small amounts of high explosive. Upon detonation of the explosive the powder is dispersed against a die plate. Relatively low densities are obtained by his process.

In the publication Ceramic Age for December 1963, Porembka discusses a pre-sintering explosive compacting process, but he provides no strength or other property information and alleges only *some* particle bonding of ductile metals but no bonding of refactory or ceramic materials. Doherty and Mykkanen, in their paper "Explosive Compaction of Powdered Materials" (Aerojet Reports), claim high density for their process but supply very little other information. Theirs is also a pre-sintering process.

It is, accordingly, a further and more specific object of the invention to provide a method for producing solid, fused bodies from powdered materials which departs from the teachings of the above discussed prior art and any other known techniques by utilizing explosive forces sufficient to alter the space lattice structures of the surfaces of the grains or of entire grains of powder particles, whereby to effect complete fusion of said particles.

Still another specific object of the invention resides in the provision of a powder fusing process wherein high explosive loading is used to produce new combinations of elements in given particle grain space lattices, permanent property changes in said grains, and new alloys formed by groups of various types of grains.

Other objects of the invention will appear as the description proceeds.

BRIEF DESCRIPTION OF THE DRAWINGS

FIG. 1 is a top plan view showing a basic embodiment of the invention, the progress of the detonation wave as it moves from the initiator along the explosive charge being indicated by the broken lines and arrows;

FIG. 2 is a longitudinal section on the line 2—2 of FIG. 1;

FIGS. 3, 4 and 5 are schematic views showing the progress of a detonation wave along a charge and the sequential action of said wave upon the mass of powder particles;

FIG. 6 is a longitudinal section of the assembly of powder particles and explosive charge, in which the charge has been shaped in order to assure a uniform application of the explosive impulse to the particles throughout the length of the mass thereof and the production of a substantially flat compacted and fused piece;

FIG. 7 is a section on the line 7—7 of FIG. 6 and showing the relative thicknesses of the mass of powder particles and the explosive charge near the initiator end of the charge;

FIG. 8 is a section on the line 8—8 of FIG. 6;

FIG. 9 is a section on the line 9—9 of FIG 6 and showing the exposive charge as having a slightly diminished thickness and a slightly concave lower surface;

FIG. 10 is a section on the line 10—10 of FIG. 6 and showing the explosive charge as having a further diminished thickness and a more concave lower surface;

FIG. 11 is a section on the line 11—11 of FIG. 6 and showing the explosive charge as it would appear near the end of the powder particle and explosive charge assembly, the lower surface of said charge having less concavity;

GENERAL DESCRIPTION OF THE INVENTION

Figure 12:
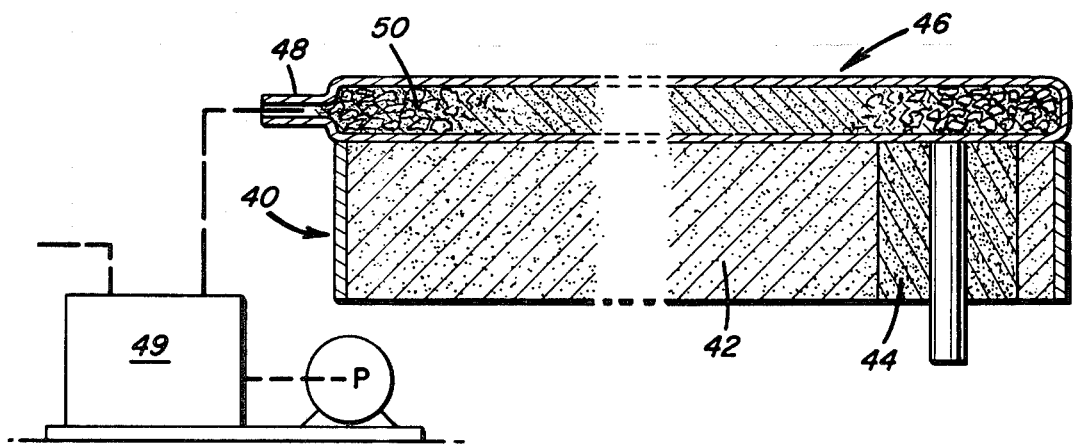
FIG. 12 is a section showing a modified arrangement, wherein means is employed for placing the mass of particles in a vacuum, or in a controlled atmosphere, or under pressure.
Figure 13:
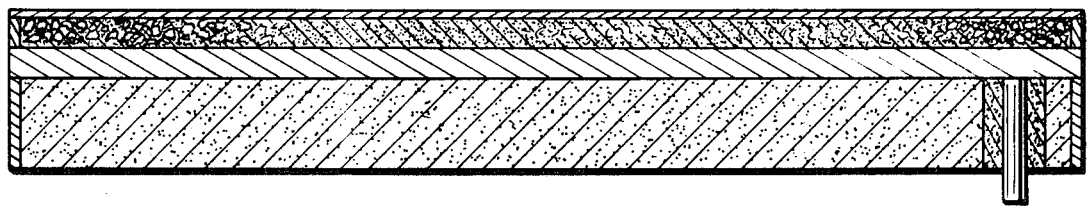
FIG. 13 is a section of a further modification showing the use of a flat modulating layer between the mass of particles and the explosive charge.

To provide a basis for a thorough understanding of the present invention, a brief discussion of the structure of materials, particularly metals, is believed desirable. As applied to the subject matter of the present invention, the structure of metals can be thought of as having two characteristics. The first of these is the "internal" structure, i.e., how the atoms are arranged. This structure is often referred to as a space lattice. The atomic lattice structure of simple materials, such as pure iron, are well-known; complex materials of several elements or sub-groups of elements are more difficult to define and study. In most of the materials used in the process of the present invention, a given space lattice, such as a cubic structure, only exists over a small dimension, and is called a crystal or a grain. In iron and steel these grains are usually quite small and may be seen only by a microscope. Such a grain contains a very large number of atoms. Next to this grain will be other grains each having the same type of space lattice but usually oriented at some angle relative to the first grain. Between the grains or around each grain is a boundary, called a grain boundary. In some cases this grain boundary theoretically has no substance itself and the material (grains) is held together by very nearly cohesive forces of close proximity. In most cases, however, the grain boundary is a thin wall of material, usually having a structure different from the grains themselves. In still other cases the grain boundary may be somewhat thicker or several types of very small grains may be present in a boundary zone. This grain boundary is the second metal characteristic.

Powder particles vary in size over a large range, i.e., from less than a micron in diameter to many microns. It will therefore be understood that some of the smaller particles may contain only one grain while other, larger ones may contain many grains.

The method of fusing of the present invention contemplates forming, or even reforming, space lattice structures to produce, in some cases, new combinations of materials. At least three effects are involved, namely, the production of new combinations of elements (atoms or groups of atoms) in a space lattice, permanent property changes in the materials acted upon, due to high pressure and/or high rates of loading, and new types of alloys formed by the combination of several types of grains and, in some cases, grain boundary materials. The three effects are not, of course, completely independent, but will be so described for the purpose of clarity in this disclosure.

The first effect concerns new combinations of elements within a single space lattice. By high explosive loading it is possible to force the addition of other materials into a lattice of a given material, either pure or alloy. A very simple example is obtained when a powder mixture of separate particles of iron and a small amount of carbon is loaded by a detonated explosive charge; the detonation wave forces can be such that the carbon particle is broken up and dispersed from its original position, in the direction of the wave passage. Depending upon the detailed design, various degrees of carbon-iron reaction will occur. At one level of force, the carbon combines with the iron and new, reasonably large grains of carbon/iron are formed. These new grains will be different in shape, color, reaction to chemical etch, various mechanical properties, etc., from either the original carbon or iron grains, and the reaction can be made to vary from a grain which was constituted of a high proportion of carbon down to grains of iron which barely evidenced a color difference when viewed under a microscope, or relatively small differences in microhardness.

The second effect, property changes, is concerned with permanent alterations in the product, metal or non-metal, which are due to the imposition of the high explosive load. For example, in irons and steels permanent changes in hardness, strength, and other mechanical properties can be effected by exposure to explosive detonation forces. Moreover, the physical properties of explosively fused materials are susceptible to a broader and/or different range of change from those of cast or wrought materials. Explosively fused materials can, of course, be given subsequent mechanical working and/or heat treatments, for even a broader range of property control.

The third effect, as stated above, concerns the modification of grain boundaries and combination of grains. That is, a properly applied pressure shock wave of adequate intensity affects both the grain itself (the space lattice) and the grain boundaries. More specifically, the intensity of the strong shock wave can be predetermined so that it is sufficient to cause a fusion of the outer boundaries of the powder particles. In such a case the resulting grain size is very closely that possessed by the original particles. As the intensity of the pressure shock wave is increased, the size of the grains will be altered in addition to being fused; with some materials, the size of the grain can be made to grow appreciably. It will thus be seen that the space lattices of the smaller grains have been rearranged and that some of the grain boundaries have been caused to move or disappear. The fusion of particles together can be thoroughly performed, such that great strength, low electrical resistivity, very high density, are achieved. Thus, this process is quite in contrast either to mechanically squeezing or to a combination of mechanical and thermal treatments as used in the prior art.

In the process of the present invention a layer of powder particles is placed upon a high explosive charge. When the charge is detonated a detonation wave progresses therethrough, and this wave is characterized by high pressure at a high loading rate. At the instant the detonation wave reaches a powder particle, a severe shock wave will be generated in the powder and the particle is subjected to this high pressure at a high loading rate. Two effects occur simultaneously. One, the particle receives an impulse as the pressure wave passes through it, and it is projected at a very high velocity away from the explosive. At the interface next to the explosive charge these particles, which are usually very small, will be projected at nearly the speed of the detonation wave, i.e., about 25,000 f.p.s. Succeeding particles will be progressively accelerated as the pressure wave passes through the thickness of the powder layer. As the shock wave passes through a mass, however, it loses some energy. Thus, succeeding particles will be accelerated less than preceding ones and the spaces between the particles will be closed. A compression will take place and the resulting density of the compacted particles will depend upon the extent of the compression. The above description ignores the complexities that would be introduced by wave reflections, etc., for the purpose of simplicity.

Simultaneous with the particle acceleration process above described in the action of the high pressure on the material itself. A high pressure shock wave imposed at a very fast rate will place each particle in a high energy field for a short time. One of the effects of this energy upon the space lattice is manifested as a thermal effect, with the result that the atoms and their electrons are placed in a high state of agitation. It has been calculated that the passage of such a pressure wave causes a momentary state equivalent to 15,000 to 20,000K or above. Under such a condition many of the electrons will be momentarily freed and will be able to join neighboring nuclei of adjacent atoms at a grain boundary, or if the pressure wave is sufficiently intense, it will cause modification of grain boundaries, with the result that neighboring lattices will be reformed and joined. It will thus be understood that such energized powder particles will be capable of combination with adjacent energized powder particles when they are brought sufficiently near to each other by the acceleration and compression process described above. In effect, there is the equivalent of a molten condition at the particle surfaces or throughout the particles if the pressure wave is sufficiently strong.

Normally in the case of metals and metal alloys, large amounts of thermal energy are used to slowly melt ores and the like to form liquids. Various types of alloys are formed to the extent that materials are soluble in each other or to the extent that they can be suspended in each other. The molten liquor thus formed in cooled, i.e., cast, to form alloys and precipitates under the normal ambient temperature and confinement conditions. Subsequently, the casting may be worked (wrought) to produce better grain characteristics and better properties. In the process of the present invention, a relatively small amount of energy is used but by the proper timing of the dynamic events, a solid fused piece of material is produced from particles without the usual melting, casting, anf wroughting, and with broader ranges of solubility and suspension qualities than those yielded by castings. That is, normal melt, cast, and wrought methods permit the production of alloys within certain limits only. The high speed explosive compaction method of the present invention permits the formation of a broader range of materials and percentages.

Further, the present process is not limited to metals or metal alloy mixtures. It is possible to use much higher percentages than normal of usually incompatible substances, such as Silicon Carbide in aluminium, Tungsten Carbide in iron, Tungsten and Tungsten Carbide and Silicon Carbide in iron, and many others. This result is achieved by taking advantage of the properly timed dynamic events as described above. With normal melting and casting processes only low pressures under long time conditions are used. Pressure and time in the instant process are both important variables. Ambient pressure of course returns when the high pressure is removed, and normal cast solidification conditions would prevail if the process used were a slow one allowing time for full relaxation and chemical-physical changes. Such reactions require finite times. However, the very high pressure process of the present invention is ultra-fast but of short duration, and sufficient time for a full return to normal conditions does not exist. It is therefore possible to trap permanently to some degree the conditions that existed at high pressure and retain them at atmospheric pressure and temperature. The result is that by the use of the instant process it is possible to produce new materials on a practical basis.

From the above it will be understood that by the use of the high explosive compaction process of the present invention it is possible (1) to produce fused metal compacts that are superior to those made by the explosive/propellant processes of the prior art (2), to produce fused bodies of pure or alloyed metals which are equivalent in properties and degree of solidity to those obtained from present day melting/casting/wrought processes (3), to produce pure and alloyed metals which are superior in properties to those obtained from present day melting/casting/wrought processes (4), to produce new alloys, both metallic and non-metallic, which cannot be produced by prior art processes. Moreover, by the use of the new process it is possible to improve and refine grain space lattice structures and grain boundaries to effect improvement in the physical properties, i.e., strength, ductility, and uniformity of grain size, of the finished compact. By the proper choice of powders and assembly design parameters, the use of this new process allows the formation of a solid fused body with a hitherto unobtainable uniformity of grain size; further, a degree of grain size control is possible with this process which will allow ultrafine (one to a few microns) grain size.

In order to effect successfully the above accomplishments, the manner in which the impulse from the explosive is delivered to the powder is of extreme importance. A basic requirement is that the impulse delivered over the contact area must be essentially uniform in magnitude and direction. This is necessary so that as adjacent particles are energized, accelerated, and compressed, they will remain in very close proximity to each other at high pressure for a sufficient time, although only a few microseconds, to become fused. Thus, the local and overall uniformity of both the powder body and the explosive must be to a high order. Further, after final acceleration (to as high as several thousand feet per second in some cases) all parts of the fused body must be projected very nearly in the same direction, lest excessive tensile and shear forces be developed which will cause fragmentation of the body to occur. Also, although any direction of approach of the detonation wave can be used, this direction of approach must be nearly uniform over the portion of the powder body that is to be considered useful; provided the tongue dimension is of sufficient length, FIG. 1 illustrates such a detonation system, although others have also been used. The geometric design and explosive and powder parameters (such as thickness) must also be so chosen as to prevent spallation or fracture of the powder body due to reflection and rarefaction waves following detonation.

The nature of this invention is such that its applicability to types of materials is very broad. Very generally, it is applicable to almost all known types of metals, both pure and alloys. Examples of those which have been tested include W, Fe, Al, Mg, Mu, Ti, Ni, Mo, Co, various steels, stainless steels, Cu, and others.

Further, very broad ranges of metals, both pure and alloyed, have been used to form powder mixtures, and upon fused compaction yield new, previously unobtainable alloys. Also, it has been possible to incorporate high percentages of non-metallic materials, both pure and various compounds, into powder mixtures with metals, and to successfully fuse the overall powder body together. Examples include carbon and various carbon alloys, Si, SiC, WC, and others.

DETAILED DESCRIPTION OF THE INVENTION

Referring to the drawings, and first to FIGS. 1 and 2 thereof, there is shown a basic embodiment of the invention reduced to its simplest form. In these views a substantially rectangular container is shown at 10. The container 10 has an end wall 12 and side walls 13 and 14 which converge to define a tongue shaped extension 15. The container is closed at its upper end by a top wall 16, and spaced below the top wall is a separator plate 17.

A mass of powder particles 20 is placed in the container between the top wall 16 and the separator plate 17 and an explosive charge 18 is positioned in the container below said plate. A detonator 22 and a booster 24 are embedded in the charge near the apex of the tongue shaped extension 15. The geometric proportions and magnitude of the dimensions will depend upon the size of the product desired, the powder material to be used, and the degree of treatment (such as grain size) of the grains that is desired; since these objectives and materials vary over very broad ranges, any particular value given would represent only one of a very large number of possibilities. However, by way of illustration, consider the use of relatively clean iron powder of an initial particle size of about 6 microns (spherical); consider also the use of an explosive equivalent in characteristics to Comp. C–3; consider a length and width of about 12" x 6", particles which are fused but in which no significant grain growth has occurred can be obtained, for example, with a powder thickness of 5/16" and an explosive thickness of 7/16"; spallation or other cracks will not occur from such proportions; edge and side effects in such an assembly will not be appreciable or severe, but a band approximately one inch wide around the outer perimeter of the plate will be bent somewhat with the central portion being essentially flat. The use of larger amounts of explosive will yield not only very complete fusion but also substantial modification of the grain structure and related properties provided that adequate geometric control over the momentum exchange is maintained.

It should be understood that although the walls and the separator plate are shown as having substantial thickness, for the sake of clarity, in practice they may be extremely thin. For example, a typical separator plate and bottom wall, where the powder practices were iron, would be thin low carbon steel sheet from 0.0005 up to 0.020" thick, cadmium plated to about 0.0002 thickness to prevent adherence of the iron particles. If desired a thin stainless steel plate could be used. In some cases an even more ideal arrangement would be to employ no separator plate and no bottom wall, to obtain maximum effectiveness of the explosive charge on the mass of particles. Is should be further understood, however, that it may be desirable to vary the thicknesses of the separators, walls and masses to satisfy the requirements of certain situations. For example, when fabricating certain powder combinations in small or unusual physical shapes or sizes, the thicknesses, widths, shapes, and densities of the end and side plates may be substantially greater than those implied above.

When the explosive charge 18 is initiated, the detonation wave will propagate at high speed through said charge from the region of the tongue shaped extension 15 to produce an intense pressure pulse and thus a high rate of loading. The pressure pulse and loading rate may be described as the pressure time curve of the entire detonation wave and the speed of reaction (propagation) of the detonation reaction zone. The amount of pressure-time and speed required depends upon the powder particles being compacted, i.e., their chemical composition, size, shape, surface condition, etc. For some powder particle compactions a peak pressure of 750,000 p.s.i. minimum, up to 20,000,000 for others, would be used, with pulse durations of from about 1 microsecond up to 20 microseconds, and useful propagation speeds from 10,000 feet per second on up.

With the proper design, the pressure pulse will produce a uniform impulse-momentum exchange between the explosive and the powder particles. That is, the motion of the particles in response to the explosive pressures wave must be substantially the same at the right time or said particles will not stay adjacent each other long enough to fuse well and the local pressures will be bled appreciably. It should be borne in mind, in this connection, that the powder particles have quite different properties than the final solid compact, and that one result of the intensity of the pressure wave is the initial momentum imparted to each particle, which momentum is a function of the atomic mass of the particular particle. In a given geometry, say a flat plate, any material will have some upper limit as to the total impulse it can accept lest the energy field be ho high that undesirable sidewise motion of the particles will begin to occur as the powder body is compressed. A light element such as aluminum will have a lower limit than say tungsten or iron.

It is desired to emphasize that, as stated, the above description pertains to the simplest form of the invention, i.e., the formation of a compact by the application of forces in a one or two dimensional geometry. Although compaction of pieces utilizing forces applied in three dimensions requires a more complex design, the same general principles would be employed.

In FIGS. 3, 4, and 5 of the drawings the progress of the detonation wave front from the detonator through the charge 18 is shown. In FIG. 3 the detonation wave is shown prior to its impingement on the powder particles 20; in FIG. 4 the wave has acted upon some of the particles 20 to effect fusion thereof, and in FIG. 5 the wave has passed a substantial distance along the mass of particles, for effecting fusion thereof and, by the action of the intense pressure wave, the production of a solid fused compact 26. In FIGS. 3, 4, and 5 the detonation wave has been shown as a side-on wave. It should be understood, however, that a face-on or combination face-on/side-on detonation arrangement may be used, as desired. It should be further understood that although a single point detonator has been shown, the explosive charge can be initiated at more than one point, if desired.

Figure 20:
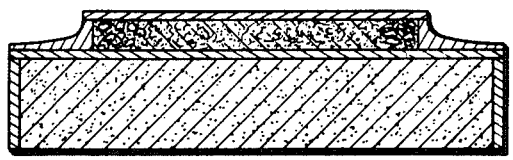
FIG. 20 is a transverse section showing a further modification utilizing shaped inert confinement pieces at the sides of the powder particle mass for partially compensating for side effects produced by the detonation wave.
Figure 21:
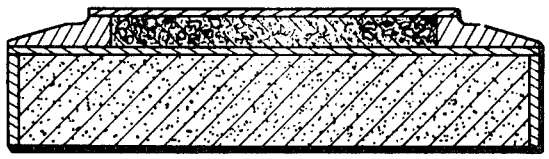
FIG. 21 is a view similar to FIG. 20, but showing a slightly altered shape for the confinement pieces.
Figure 14:
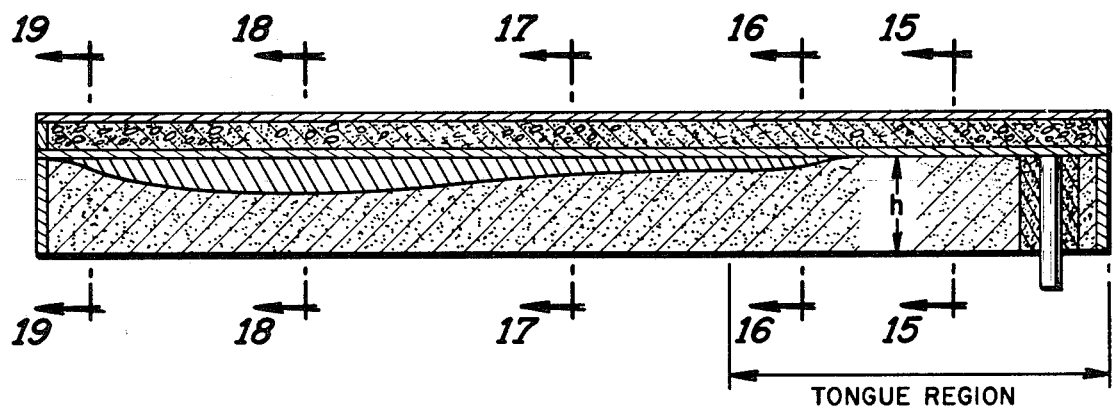
FIG. 14 is a section of a further modification showing an example of a shaped modulator layer for use with certain types of powder particles and explosives.
Figure 15:
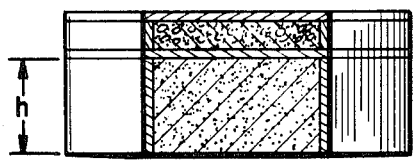
FIG. 15 is a section on the line 15—15 of FIG. 14.
Figure 16:
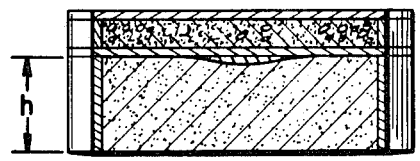
FIG. 16 is a section on the line 16—16 of FIG. 14.
Figure 17:
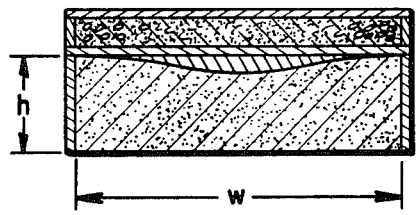
FIG. 17 is a section on the line 17—17 of FIG. 14.
Figure 18:
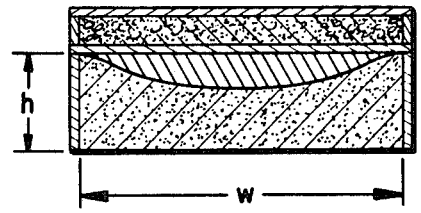
FIG. 18 is a section on the line 18—18 of FIG. 14.
Figure 19:
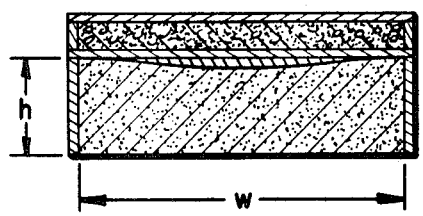
FIG. 19 is a section on the line 19—19 of FIG. 14.

Explosive reactions of finite sized assemblies are subject to variations in impulse over the powder/explosive interface due to what has been commonly referred to as end effects, side effects, etc., in which rarefaction and reflection waves modulate the output of the detonation wave. Such effects will be present even in such simple geometries as shown in FIGS. 1 and 2, with the result that some bending around the edges of the compacted piece will occur, as will small edge spalls, leaving a jagged edge surface. For some uses and where reasonably large assemblies are used, the action of the end and side effects may not be considered serious enough to cause concern, although a non-flat compact will result. Where it is desired to have greater flatness over the entire area of the resultant piece, or where small sized assemblies are to be used, or large quantities of explosive are required, it is necessary to compensate for the end and side effects by proper design of the explosive/powder assembly. Three methods have been used separately or in combination: (a) shaping the explosive such that a compensation in thickness effectively compensates for most of the end and side effects (FIGS. 6 through 11), (b) interposing modulating layers of inert or active materials between the explosive and powder particles (FIGS. 13 through 19), and (c) using properly shaped inert confinement pieces at the sides and ends (FIGS. 20 and 21).

FIGS. 6 through 11 are included to illustrate explosive shaping only. In FIG. 6 the mass of powder particles is shown at 30 and the explosive charge at 32. To avoid end and side effects, the charge 32 is shaped by reducing the thickness thereof from a point in the region of the detonator, indicated at 34, toward the opposite end of said charge. As will be seen, the lower wall of the charge is cut away to form a concave surface, and so that the thickness of the charge at the end remote from the detonator is less than that at the said detonator end. FIGS. 7 through 11, which are transverse sections, show the contour of the charge at the indicated points along its length.

Examples of rather simple powder mixtures which have been tested are those using tungsten carbide and iron; a broad range of this mixture can be successfully compacted by this invention, such as

| | Percent |
|---|---|
| WC | 20 |
| Fe | 80 | and

|     | Percent |
| --- | --- |
| WC  | 45 |
| Fe  | 55 | and

|     | Percent |
| --- | --- |
| WC  | 75 |
| Fe  | 25 |

Interestingly enough, such compacts yield substantial tensile strength, in contrast to the nearest approximation to this material that can be made by prior methods.

Similarly, Si and Al or SiC and Al are further examples. A typical example of a more complex mixture is

|     | Percent |
| --- | --- |
| Fe  | 30 |
| W   | 10 |
| WC  | 10 |
| SiC | 10 |
| Mo  | 8 |
| Ni  | 8 |
| Co  | 10 |
| Ti  | 5 |
| Al  | 4 |
| C   | 0.1 |
| Cu  | 4.9 |

Tests have demonstrated that there is a strong dependence between the ease with which good fusion bonding is obtained, the type of powder particles used, and the amount of explosive needed, uniformity in the product being dependent upon how uniform the mixed powders are. Uniformity in density is essential to produce a crack and spall-free final compact. It has not been necessary, however, to use a high powder density, as by the pre-pressing step used in the prior art, before initiating the explosive charge, to obtain a good final product.

Referring now to FIG. 12, which illustrates, schematically, a modified embodiment of the invention, the container for the explosive charge is shown at 40. A high explosive charge is shown in the container at 42 and a detonator/booster at 44. Closing the container at its upper end is an envelope 46 which is formed of any suitable thin walled material. The envelope 46 is provided with an inlet neck 48 for attachment to a vacuum pump or atmosphere control device 49. Positioned within and preferably filling the envelope 46 is a mass of powder particles 50.

The modification of the invention, shown in FIG. 12, permits one parameter control not discussed hereinabove. This pertains to the atmosphere surrounding the powder particles. During the powder compaction process, in the absence of control, some of not all of the atmosphere surrounding the particles is trapped in the final solid compact, since said atmosphere is acted upon by the pressure wave at the same time as the particles. Any such retained atmosphere will, of course, affect the properties of the solid compact, for example, its electrical resistance. Modification of the properties of the final compact may be effected by evacuating the envelope 46, using various gases therein, and varying the pressure of any such gases up to several thousand p.s.i.

What is claimed is:
1. The method of producing a solid, fused body from powdered material, which comprises:
   utilizing a sufficient quantity of explosive of a type capable of achieving fusion of a mass of particles of such powdered material,
   providing a detonation system for the explosive,
   arranging the mass of particles of powdered material in close proximity to the explosive so that detonation forces produced upon detonation of the explosive will be applied to and accepted into the mass of particles in a substantially uniform manner and direction,
   and detonating the explosive.

2. The method of claim 1, including the additional step of placing a separator plate between the mass of particles of powdered material and the explosive charge.

3. The method of claim 1, wherein the pressure-time characteristic of the pulse from the detonating explosive can be selected such as to obtain varying degrees of modification of the grain boundaries and space lattices of the fused particles to improve the strength, ductility and uniformity of grain size of said solid fused body.

4. The method of claim 1, wherein the grain structure of the solid fused body is characterized by extreme fineness.

5. The method of claim 1, including the additional steps of shaping the explosive, whereby uniformity of application of the pressure pulse to the mass of particles will take place.

6. The method of claim 1 wherein the particles of the mass of powdered material consist of pure metal.

7. The method of claim 1 wherein the particles of the mass of powdered material consist of metal alloys.

8. The method of claim 1 wherein the particles of the mass of powdered material consist of a mixture of a metal and a non metal.

9. The method of claim 1 wherein the particles of the mass of powdered material consist of a plurality of pure metals.

10. The method of claim 1 wherein the particles of the mass of powdered material consist of a plurality of alloys.

11. The method of claim 1 wherein the particles of the mass of powdered material consist of a plurality of metals and non-metals.

12. The method of claim 1, including the additional step of controlling the atmosphere about and within the mass of particles.

13. The method of claim 1, including the additional step of removing the atmosphere from about the particles.

14. The method of claim 1, including the additional step of introducing a fluid under pressure about and within the mass of particles.

15. The method of claim 1, including the step of placing confining pieces at the side and ends of the mass of particles of powdered material for compensating for side and end effects produced by detonation of the explosive charge.

16. The method of claim 1, including the additional step of placing a modulating layer between the mass of particles of powdered material and the explosive charge.

17. The method of claim 16, including the additional step of shaping the modulating layer.

References Cited

UNITED STATES PATENTS

| 3,022,544 | 2/1962  | Coursen et al. | 18—5 Iux. |
| 3,023,462 | 3/1962  | Taylor et al.  | 18 Explosive Dig. |
| 3,081,498 | 3/1963  | Davis et al.   | 18 Explosive Dig. |
| 3,084,398 | 4/1963  | Swed           | 18—5(I)X |
| 3,220,103 | 11/1965 | Simons         | 18 Explosive Dig. |

OTHER REFERENCES

Ceramic Bulletin: Vol. 45, No. 3, March 1966, TP 785.A63, pp. 266–270.

Marks' Mechanical Engineers' Handbook; 6th Edition, 1958, TJ151M37 1958 C.9, pp. 7–40 and 7–41.

R. SPENCER ANNEAR, Primary Examiner

U.S. Cl. X.R.

164—119; 264—111